United States Patent [19]

Catalanotti et al.

[11] Patent Number: 4,919,608
[45] Date of Patent: Apr. 24, 1990

[54] MOLDING APPARATUS WITH COLLAPSIBLE CORE

[75] Inventors: Paul Catalanotti, West Newton; Ali Lotfi, Quincy, both of Mass.

[73] Assignee: Roehr Tool Corporation, Hudson, Mass.

[21] Appl. No.: 253,127

[22] Filed: Oct. 4, 1988

[51] Int. Cl.$^5$ .............................................. B29C 33/48
[52] U.S. Cl. ...................................... 425/556; 249/59; 249/68; 249/176; 249/178; 264/313; 425/577; 425/438; 425/DIG. 58
[58] Field of Search ...................... 264/313, 318, 328.1; 249/59, 68, 176-178, 183; 425/DIG. 5, DIG. 58, 438, 556, 577

[56] References Cited

U.S. PATENT DOCUMENTS 2,327,665  8/1943  Peat ........................................ 249/59
3,905,740  9/1975  Lovejoy ..................... 425/DIG. 58
4,019,711  4/1977  Altenhof et al. ........... 425/DIG. 58

FOREIGN PATENT DOCUMENTS 508344  1/1952  France ................................. 249/59

Primary Examiner—Jill L. Heitbrink
Attorney, Agent, or Firm—Richard P. Crowley

[57] ABSTRACT

A collapsible core and molding apparatus and method for molding a plastic article having an undercut and a non-undercut portion. The collapsible core includes a center core pin and a core sleeve about the core pin and with the core pin having a small plurality of alternating, uniform, narrow, non-collapsing segments secured to the center core pin and the same plurality of uniform, alternating, wider, arcuate, collapsing segments secured to the core sleeve, the wide collapsible segments adapted to move between the non-collapsed segments to form the expanded position for a molding operation where the wide segments are separated by the narrower segments, and a collapsed position where the collapsible segments collapse radially inward on the axial withdrawal of the center pin to form a generally cylindrical, cross section, arcuate area and to permit the ejection of a small molded plastic article from the mold.

10 Claims, 2 Drawing Sheets

MOLDING APPARATUS WITH COLLAPSIBLE CORE

BACKGROUND OF THE INVENTION

Collapsible cores are typically used in an injection molding apparatus for molding plastic parts requiring internal threads, undercuts, protrusions or cutouts or similar deformations which preclude the direct or straight line withdrawal of the molded plastic article from the mold cavity of the molding apparatus. Collapsible cores in molding apparatus permit the production of plastic parts in an economical, high or low volume basis.

There are a wide variety of collapsible cores in molding apparatus, such as for example, a molding apparatus with a positive collapse core as described in U.S. Pat. 4,456,214, issued June 26, 1984. The molding apparatus disclosed provides for a collapsible core with the core comprising separate, individual segments and with a mounting means for holding the segments against longitudinal movement and for providing a fixed pivot axis for the segments so that the segments may rock about an individual axis between a molding position and a release position, and with the core also comprising an actuator rocking the segments from one of said positions to the other. U.S. Pat. 3,618,170, issued Nov. 9, 1971, also describes a molding core employing collapsible and noncollapsible segments to provide for example a molded cap with an interrupted thread with the collapsing segments pivoting within a housing, while U.S. Pat. 1,274,673, issued Aug. 6, 1918, describes a glass molding apparatus with two pivoting, collapsible segments. These positive collapse cores employed in molding apparatus are all pivot-type collapsible cores.

An earlier collapsible core patent is U.S. Pat. 3,247,548, issued Apr. 26, 1966 hereby incorporated by reference. This earlier, basic collapsing core provided for a core having six wide and six narrow alternating segments herein all of which are collapsible and all of which are attached to a common core base. In this type of a collapsible core, the narrower collapsing segments are designed to collapse before the wider collapsible segments and thus provide a collapsible core with all segments collapsible with the narrow and wide collapsible segments collapsing at a different time in the molding cycle. While such a collapsible core in the molding apparatus is satisfactory, there are certain disadvantages associated with the use of all collapsible segments wherein certain segments must collapse in a timing sequence before other segments for the proper functioning of the collapsible core.

U.S. Pat. 4,130,264, issued Dec. 19, 1978, describes an expandable core for an injection molding apparatus with axially moving segments about a core pin having a plurality of faces with the faces sloping axially toward the axis of the pin and with a sleeve having first and second slides which alternate about the core pin with the slides also having a sloping surface. Such prior art collapsible-type core molding apparatus with so many segments are not well adapted to the production of very small plastic parts having internal undercuts, ribs, interrupted threads or similar deformations.

SUMMARY OF THE INVENTION

The present invention concerns a collapsible core and an injection molding apparatus employing such a collapsible core and to a method of molding employing such collapsible core. In particular, the invention concerns an injection molding apparatus having a collapsible core designed for the molding for instance of smaller plastic articles having an internal interrupted thread, rib or undercuts or similar deformations which preclude the straight line withdrawal of the plastic article from the mold cavity.

A collapsible core has been discovered wherein the collapsible core comprises an assembly made up of only three components: a center core pin having a small number of noncollapsing segments at one end, a core sleeve about the center core pin having a small number of collapsing segments at one end which mate with and alternate with the noncollapsing segments and preferably, a positive safety collapse sleeve about the exterior of the core sleeve. The core sleeve and the center core pin define at the one end of a molding cavity for the molding of a small plastic article and closures generally less than about 25 mm in diameter. The molding area consists of two sections: a plurality of collapsing segments, typically 3 or 4 collapsing segments, and a plurality of noncollapsing segments, typically three or four noncollapsing segments, which segments alternate around the periphery of the core sleeve at the one end.

The core sleeve is designed in a molding operation to move between a molding position where the collapsing segments are expanded and wherein the plastic is injected into the mold cavity, and a collapsed position where the core pin with the noncollapsing segments are axially withdrawn and the collapsing segments collapse radially inward and wherein the molded plastic article is ejected from the mold cavity.

The core sleeve comprises a generally cylindrical base with a plurality of separated, elongated, flexing, collapsing segments or spines extending from the core sleeve base and free at one end to move between a radially inward collapsed position to form a mating, fitted cylinder at the one end and a noncollapsed position. In the noncollapsed position, the core sleeve segments alternate in a snug, mating, fixed, expanded relationship with the noncollapsible segments of the center core pin to form an enlarged cylinder at the one end. The collapsible core sleeve segments collapse inwardly on withdrawal of the center core pin, and thus remove the collapsible segments from the undercut position of the molded article in the mold cavity and permits the molded article to be ejected. The collapsing segments because of their shape and generally by heat treatment have flexing qualities so that they act in effect as leaf springs, one end free and the other end fixed to the base of the core sleeve.

The flexing characteristics and properties of the one end of the collapsing segment in addition to a positive collapse sleeve which mechanically assures collapse causes the actual collapse of the collapsing segments in a manner similar to the collapsible segments in the cited U.S. Pat. 3,247,548. The collapsing segments of the core sleeve however are separated from each other in the expanded position by a plurality of alternating, noncollapsing segments of the center core pin. Generally, the center core pin is an elongated pin having at the one end thereof a plurality, for example three or four, of fixed fins or blades, raised, axially elongated, uniformly spaced and spaced apart segments thereon. These raised, noncollapsible segments are generally narrow in width in comparison to the width of the collapsible segments of the core sleeve. The fixed, noncollapsible segments in the expanded position of the core are matingly engaged in a close relationship with the collapsing segments to form for example 3 or 4 generally rectangular sections equally and longitudinally spaced about the center core pin. Generally, the collapsing segments would represent a significant portion of the end cross section area of the core in the expanded position, such as for example over 80%. The greater cross sectional area of the flexing or collapsible segments of the core sleeve increase the overall strength of the flexing segments as compared to the prior art.

The surfaces of the collapsing and noncollapsing segments optionally and preferably are slightly tapered radially inward toward the one end. The tapered segments provide for better wear characteristics when they move between the expanded and collapsed positions. Further, such tapered segments permit the easy withdrawal of the molded plastic article, since typically there is plastic shrinkage on molding.

The design of the collapsible core of the invention permits the molding of small plastic articles from a plastic-like nylon, like closures, with a combination of smooth and undercut, threaded or ribbed interior surfaces and overcomes the disadvantages of prior art cases with too many moving segments in cross section. The narrow width, noncollapsing segments or splines on the center core pin on axially withdrawal movement from the expanded molding ejection position permit the formation of the smooth interior sides. The one sleeve with the larger width collapsing segments or splines collapses radially inward on axial withdrawal of the center core pin and permits the ejection of the undercut portion of the plastic article.

In operation when the center core pin is positioned within the core sleeve in the molding position, the core sleeve segments making up the cylindrical core sleeve have been expanded outwardly by the core pin through the correct molding position with the narrow, noncollapsing segments filling the space between the alternating, flexing, collapsing segments. The one end of the collapsible core is placed within the mold to form the mold cavity for the molded article. After molding and when ejection of the molded plastic article takes place, the center core pin is withdrawn away from the core sleeve and removes the noncollapsing segments from the molding area causing automatic collapsing of the one free end of the collapsing sleeve segments. The inward movement of the separate segments automatically takes place thereby releasing the molded plastic part from the molding cavity of the mold.

Optionally, a positive safety collapse sleeve is usually employed in the molding apparatus and slips over the outside diameter of the core sleeve. The collapse sleeve provides that if the collapsing segments of the core sleeve do not start to collapse at the proper moment during the ejection cycle (for example because of possible plastic material adhesion or other reasons) this positive safety collapse sleeve by reason of a chamfered bead around its inside diameter engages the lugs on the collapsible segments and acts as a cam to force them into the collapsed position so as to permit the ejection of the plastic molded article.

The invention will be described for the purposes of illustration only in connection with certain embodiments; however, it is recognized that those persons skilled in the art may make various changes, modifications, adaptations, additions and improvements to the illustrated embodiment without departing from the spirit and scope of the invention.

BRIEF DESCRIPTION OF THE EMBODIMENTS

Figure 1:
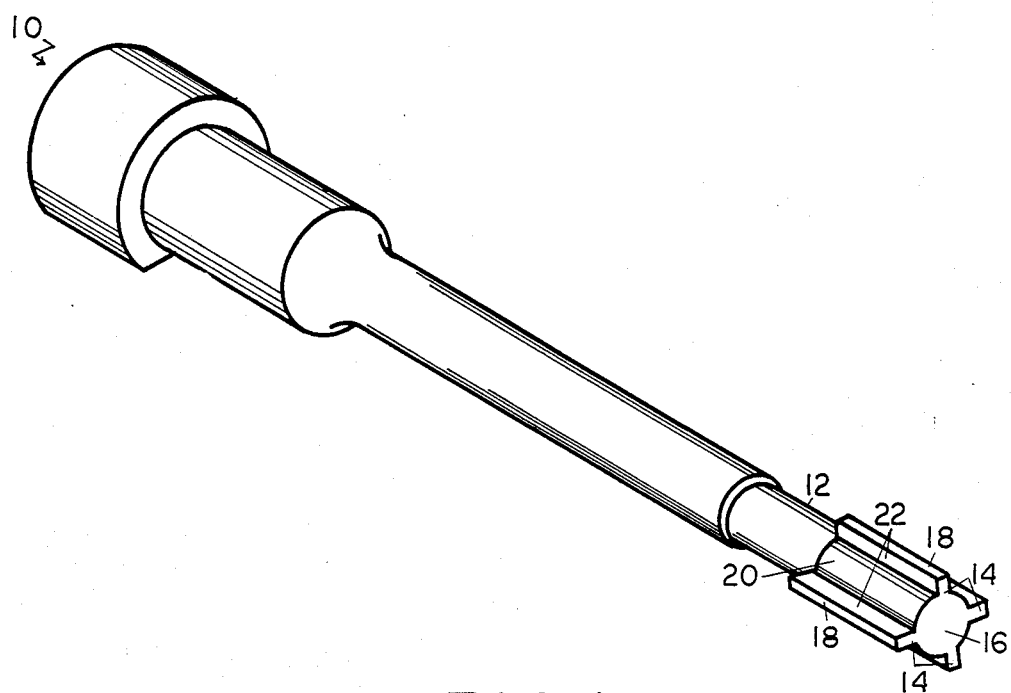
FIG. 1 is a perspective view from above of the core pin of the collapsible core of the invention.

FIG. 1 shows a metal, elongated center core pin 10 with a cylinder end 12 with fixed, noncollapsing, raised splines or segments 14 uniformly spaced at 90° (or 120° if three segments are used) about the flat end 16 with the segment surfaces 18 and 22 tapered for example about one degree longitudinally inward toward the end 16.

Figure 2:
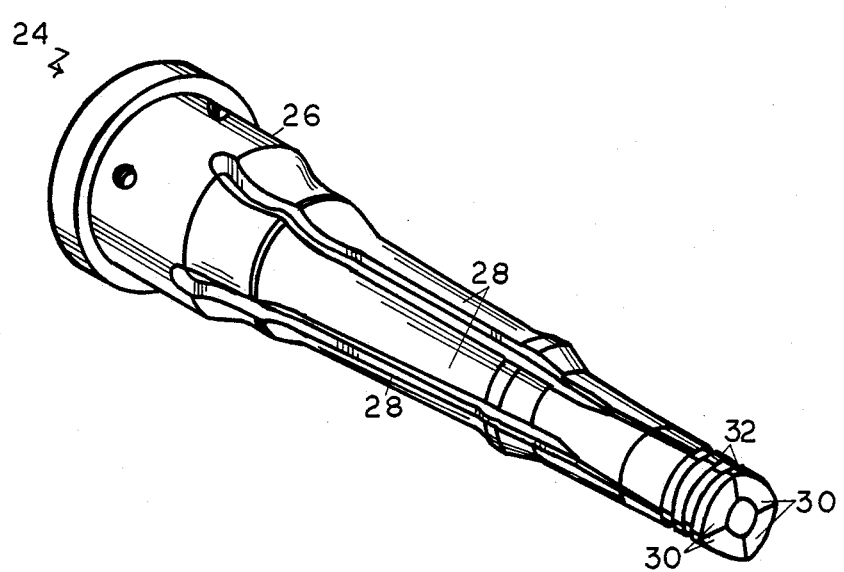
FIG. 2 is a perspective view from above of the core sleeve of the collapsible core of the invention.

FIG. 2 shows a metal core sleeve 24 having a base 26 and four separate, elongated, flexing-type, collapsible segments or spines 28 extending from the base 26 with the ends 30 of the segment 28 free and preferably not touching to avoid wear in the collapsed position as illustrated. The exterior end surface of the segments 28 contain peripheral indentations 32 to form interrupted threads in a transparent nylon plastic closure cap 46 to be molded. The surfaces of the segments 28 are tapered to match the taper of the center core pin 10.

Figure 3:
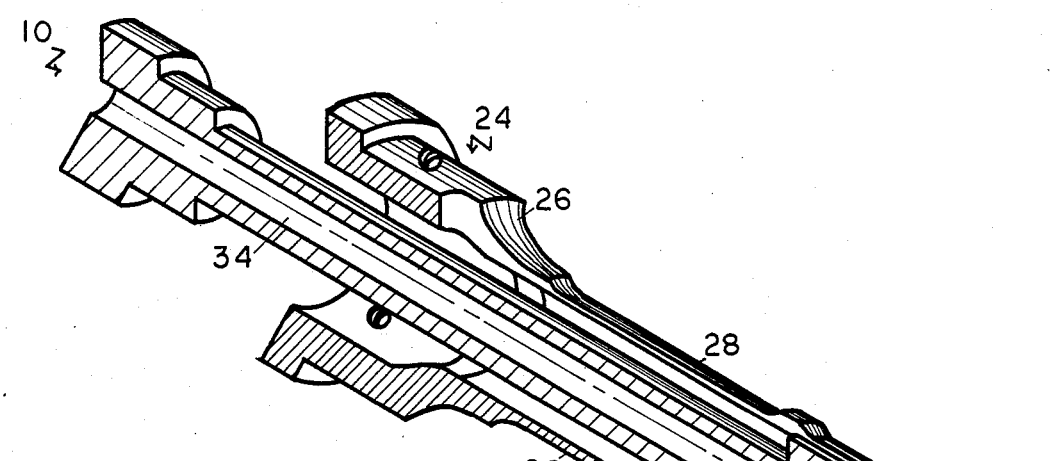
FIG. 3 is a partially sectional, perspective view from above of a collapsible core of the invention in a core expanded molding position.

FIG. 3 illustrates the center core pin 10 and the core sleeve 24 about the pin 10 in a molding position and with the core sleeve segments 28 in an expanded position and matingly engaged with the fixed segments 14 of the core pin 10 to form four uniformly alternating segments with the collapsing segments 28 to form the undercut or threaded section of the plastic article 46 constituting a major portion of the end cross section of the core assembly. In FIG. 3, there is illustrated a center core 34 in the center core pin as a cooling base for the passage of water to control temperature, while FIG. 3 does not show the positive collapse core 36.

Figure 4:
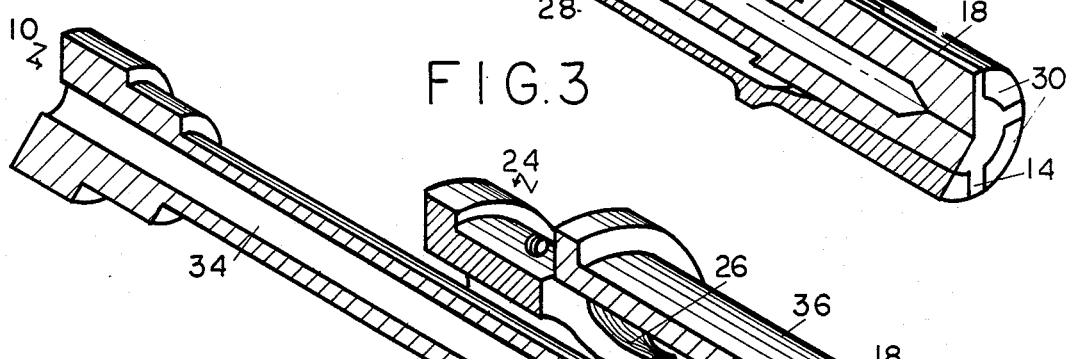
FIG. 4 is a partially sectional, perspective view from above of the collapsible core of FIG. 1 in a collapsed ejection position.

FIG. 4 illustrates the core assembly of the center core pin 10 and the core sleeve 24 with a positive collapse core 36 about the exterior of the core sleeve 24 with an inner chamfered surface in a collapsed position for the ejection of the molded plastic closure cap 46 from the mold cavity. As illustrated in FIG. 4, the center core pin 10 has been axially withdrawn with the narrow, fixed, noncollapsing segments 14 to a withdrawn position within the core sleeve 24, while the wider, collapsing segments 28 of the core sleeve 24 automatically flexed and collapsed radially inward to permit the withdrawal or ejection of the cap 46 from the mold cavity.

Figure 5:
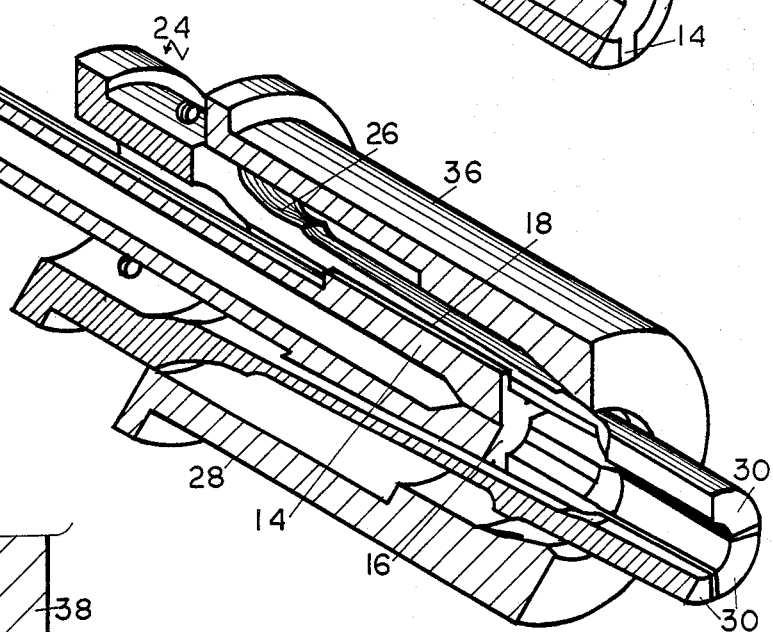
FIG. 5 is an illustrative, longitudinal, sectional view of the mold assembly with the collapsible core of the invention.
Figure 5:
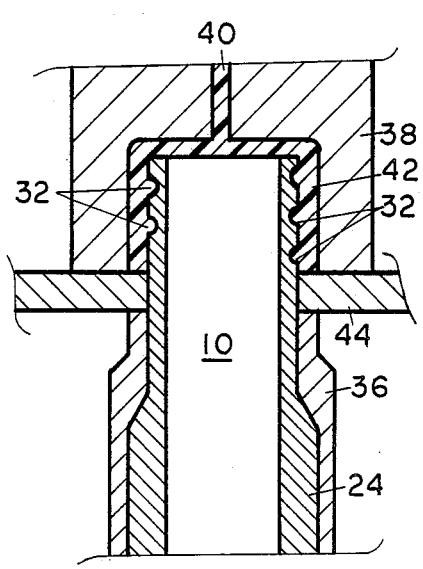
Figure 6:
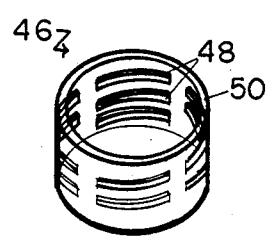
FIG. 6 is an illustrative, perspective view of the partially threaded cap produced by the mold apparatus of FIG. 5.

FIG. 5 illustrates the core assembly of the center core pin 10, the core sleeve 24 in the expanded molding position, and the positive collapse core 36 in combination with a mold member 44 and mold member 38 having a spine opening 40 to define a mold cavity for the manufacture of a small, transparent, nylon, interrupted threaded cap 46. The molded cap 46 of FIG. 6 is molded from a plastic-like nylon 42 and has a major interior, peripheral portion of threads 48 representing the area of the collapsing segments 28 and a smaller, smooth interior area 48 representing the area of the noncollapsing segments 14 of the core assembly.

In operation during the molding operation, as in FIGS. 3 and 5, the tapered surface, fixed, narrow segments 14 and the flexible, collapsing segments 28 are matingly engaged at the one end to define very narrow, fixed and wider arcuate-type, trapezoidal sections at the end of the core and in the core cavity with the threaded cuts 32 on the exterior surface of the collapsing segments 28. A plastic-like nylon 42 is injected through the spine opening 40 to form the cap 46 having for example a diameter of 20 mm or less. The center core pin 10 is then axially withdrawn a sufficient distance to permit the automatic inward collapse of the flexed, collapsing segments 28 (see FIG. 4) to a collapsed position which permits the molded cap 46 with the threads 48 to be withdrawn from the mold.

The collapsible core and mold apparatus of the invention permits the efficient manufacture of small, molded plastic articles, generally cylindrical, with interior undercut sections and non-undercut sections in the article and by using a combination of a small number of simple, fixed, noncollapsible and collapsing segments avoids some of the disadvantages of prior art collapsible cores and permits deep threaded closures with numerous thread turns.

What is claimed is:
1. An injection mold apparatus which comprises:
   (a) a mold having a mold cavity therein and a plastic injection inlet into the mold cavity for injection of a plastic to form a plastic article;
   (b) a core assembly which comprises in combination:
      (i) an axially-retractable center core pin having a first and second end and having at the first end a pin face, said axially-retractable center core pin having a plurality of elongated, equally radially-spaced apart, raised, non-collapsible segments extending to and forming part of the pin face at the first end;
      (ii) a core sleeve positioned about the center core pin and having a first and a second end, said core sleeve having a core face at the first end and a base at the second end of the core sleeve and, said core sleeve further having extending from said base a plurality of elongated, equally radially-spaced apart, flexible, collapsible segments extending to the core face, the collapsible segments each having concentric, arcuate interior and exterior surfaces with radial extending side surfaces, the number of collapsible and non-collapsible segments are equal;
      (iii) the collapsible segments and the non-collapsible segments in the expanded, non-collapsed position are arranged in a close, mating, alternating relationship to form a generally circular pin and core face assembly; and
      (iv) the collapsible and non-collapsible segments in the collapsed position are arranged wherein the non-collapsible segments are in an axially retracted position and the collapsible segments are in a radially inwardly collapsed relationship with the side surfaces at the core face of the collapsible segments in a close, parallel, non-touching relationship to each other, thereby permitting molding of a plastic article with a deep undercut section and non-undercut section.

2. The injection mold apparatus of claim 1 wherein the mold cavity and the core assembly are shaped for the molding of a plastic, threaded closure article having a diameter of about 25 mm or less.

3. A collapsible core assembly for use in an injection molding apparatus for molding of a plastic article having an undercut section and a non-undercut section, said core assembly moves between an expanded, non-collapsed position for the molding of the plastic article and a collapsed position for ejection of the plastic article, and said core assembly comprises in combination:
   (a) an axially-rectractable center core pin having a first and second end and having at the first end a pin face, said axially-retractable center core pin having a plurality of elongated, equally radially-spaced apart, raised, non-collapsible segments extending to and forming part of the pin face at the first end;
   (b) a core sleeve positioned about the center core pin and having a first end and a second end, said core sleeve having a core face at the first end and a base at the second end of the core sleeve and said core sleeve further having extending from said base a plurality of elongated, equally radially-spaced apart, flexible, collapsible segments extending to the core face, the collapsible segments each having concentric, arcuate interior and exterior surfaces with radial extending side surfaces, the number of collapsible and non-collapsible segments are equal;
   (c) the collapsible segments and the non-collapsible segments in the expanded, non-collapsed position are arranged in a close, mating, alternating relationship to form a generally circular pin and core face assembly; and
   (d) the collapsible and non-collapsible segments in the collapsed position are arranged wherein the non-collapsible segments are in an axially-retractable position, and the collapsible segments are in a radially inwardly, collapsed relationship with the side surfaces at the first end of the collapsible segments in a close, parallel, non-touching relationship to each other, thereby permitting the molding of a plastic article with a deep undercut section and a non-undercut section.

4. The core assembly of claim 3 wherein the collapsible segments are greater in circumferential, arcuate length than the non-collapsible segments.

5. The core assembly of claim 3 wherein the equal number of collapsible and non-collapsible segments is three or four.

6. The core assembly of claim 3 including a positive collapse sleeve means about the core sleeve to insure the inward collapse of the collapsible segments to the collapsed position.

7. The core assembly of claim 3 wherein the mating surfaces of the collapsible and non-collapsible segments are tapered inwardly toward the pin face and core face to permit easy expansion and collapse of the collapsible segments.

8. The core assembly of claim 3 wherein the collapsible segments comprise heat-treated, collapsible segments which act as a leaf spring and automatically collapse inwardly from the non-collapsed, expanded position to the collapsed position with axial retraction of the center core pin.

9. The core assembly of claim 3 shaped for the molding of a plastic, threaded closure article having a diameter of about 25 mm or less.

10. The core assembly of claim 3 wherein the collapsible segments have a plurality of threads on the exterior surface at the first end of the core sleeve to provide for the molding of a threaded plastic article.

* * * * *